(12) United States Patent
Deivasigamani et al.

(10) Patent No.: US 9,927,142 B2
(45) Date of Patent: Mar. 27, 2018

(54) PLUG AND PLAY MODULAR COMFORT DEVICE AND INTERFACE TEMPLATE ADAPTED TO SAID PLUG AND PLAY MODULAR COMFORT DEVICE

(71) Applicants: Sridhar Deivasigamani, Peoria, IL (US); Sivaprasad Akasam, Dunlap, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 0 days.

(21) Appl. No.: 15/159,720

(22) Filed: May 19, 2016

(65) Prior Publication Data

US 2016/0327308 A1    Nov. 10, 2016

Related U.S. Application Data

(63) Continuation-in-part of application No. 14/705,505, filed on May 6, 2015, now abandoned.

(51) Int. Cl.
| | |
|---|---|
| *F24H 9/12* | (2006.01) |
| *F24F 13/32* | (2006.01) |
| *E04B 1/72* | (2006.01) |
| *E04B 1/64* | (2006.01) |
| *E04B 1/70* | (2006.01) |
| *E04C 2/52* | (2006.01) |
| *H02G 3/22* | (2006.01) |

(52) U.S. Cl.
CPC .............. *F24F 13/32* (2013.01); *E04B 1/64* (2013.01); *E04B 1/70* (2013.01); *E04B 1/72* (2013.01); *E04C 2/521* (2013.01); *H02G 3/22* (2013.01)

(58) Field of Classification Search
CPC ... F24F 13/32; H02G 3/22; E04B 1/72; E04B 1/70; E04B 1/64; E04C 2/521
See application file for complete search history.

(56) References Cited

U.S. PATENT DOCUMENTS

| | | | | |
|---|---|---|---|---|
| 3,731,448 | A * | 5/1973 | Leo ................... | H02G 9/10 138/112 |
| 4,326,327 | A * | 4/1982 | Cox ................... | E04B 1/0023 156/304.6 |
| 6,874,823 | B2 * | 4/2005 | Viegener ............. | F16L 13/143 285/242 |

(Continued)

*Primary Examiner* — Patrick J Maestri
(74) *Attorney, Agent, or Firm* — Tracy Jong Law Firm; Tracy P. Jong; Cheng Ning Jong

(57) ABSTRACT

A modular interface template configured to receive a plug and play comfort device, the modular interface template including a wall having a first surface and a second surface, an air inlet channel configured to enable air flow from the first surface to the second surface, an air outlet channel configured to enable air flow from the second surface to the first surface, a gas conduit configured to supply fuel from the first surface to the second surface, a water inlet conduit configured to enable water flow from the first surface to the second surface, a water outlet conduit configured to enable water flow from the second surface to the first surface and a first electric power conductor configured to enable electric power transmission from the first surface to the second surface.

18 Claims, 7 Drawing Sheets

(56) References Cited

U.S. PATENT DOCUMENTS

| | | | | |
|---|---|---|---|---|
| 2003/0041554 A1* | 3/2003 | Hughes | ............. | F24H 1/206 52/741.1 |
| 2010/0201118 A1* | 8/2010 | Anton | ............. | F16J 15/064 285/93 |
| 2012/0090713 A1* | 4/2012 | Cooley | ............. | E02F 9/2275 137/798 |
| 2013/0014451 A1 | 1/2013 | Russell et al. | | |

\* cited by examiner

PLUG AND PLAY MODULAR COMFORT DEVICE AND INTERFACE TEMPLATE ADAPTED TO SAID PLUG AND PLAY MODULAR COMFORT DEVICE

PRIORITY CLAIM AND RELATED APPLICATIONS

This continuation-in-part application claims the benefit of priority from non-provisional application U.S. Ser. No. 14/705,505 filed on May 6, 2015. Said application is incorporated by reference in its entirety.

BACKGROUND OF THE INVENTION

1. The Field of the Invention

The present invention is directed generally to a modular comfort device and an interface template adapted to receive the modular comfort device. More specifically, the present invention is directed to a plug and play modular comfort device including services such as a Heating, Ventilating and Air Conditioning (HVAC) device, a humidifier and the like and an interface template adapted to the plug and play modular comfort device.

2. Background Art

U.S. Pat. Pub. No. 2013/0014451 of Russell et al. discloses a prefabricated integrated utilities building core including a floor diaphragm, four walls connected to the floor diaphragm, and a utilities access corridor, and a method of constructing a building using the same. The floor diaphragm and the four walls form an interior of the prefabricated integrated utilities building core. The utilities access corridor has at least one access wall with a passage configured to provide access to and from the utilities access corridor from the interior of the prefabricated integrated utilities building core. There are a plurality of integrated utilities arranged within the prefabricated integrated utilities building core so as to be fully accessible from within the utilities access corridor. The utilities access corridor also includes an in-floor access hatch arranged to provide access to an in-floor portion of at least the plumbing of the plurality of integrated utilities. As the building core is disposed within the internal space of a building, access to it requires access to the interior of a building. Also, as the building core is of a substantial size, removal or replacement of it requires dismantlement of the building core.

Thus, there is a need for a comfort device that can be installed or serviced without requiring access to the interior of a building and one which can be installed by simply "dropping in" the comfort device as the infrastructure required to be connected to the comfort device is provided at an interface template adapted to the plug and play modular comfort device.

SUMMARY OF THE INVENTION

In accordance with the present invention, there is provided a modular interface template configured to receive a plug and play comfort device, the modular interface template including a wall having a first surface and a second surface, an air inlet channel configured to enable air flow from the first surface to the second surface, an air outlet channel configured to enable air flow from the second surface to the first surface, a gas conduit configured to supply fuel from the first surface to the second surface, a water inlet conduit configured to enable water flow from the first surface to the second surface, a water outlet conduit configured to enable water flow from the second surface to the first surface and a first electric power conductor configured to enable electric power transmission from the first surface to the second surface.

In one embodiment, the present modular interface template further includes a second electric power conductor connecting the second surface and the first surface, where the second electric power conductor is configured to enable electric power transmission from the second surface to the first surface.

In one embodiment, the present modular interface template further includes a comfort device having an air heater configured to receive air flow supplied at the second surface by the air inlet channel and add heat to the air flow and send the air flow to the first surface at the air outlet channel.

In one embodiment, the present modular interface template further includes a comfort device having a water heater configured to receive water flow supplied at the second surface by the water inlet conduit and add heat to the water flow and send the water flow to the first surface at the water outlet conduit.

In one embodiment, the present modular interface template further includes a comfort device having an air chiller configured to receive air flow supplied at the second surface by the air inlet channel and remove heat to the air flow and send the air flow to the first surface at the air outlet channel.

In one embodiment, the present modular interface template further includes a comfort device comprising a humidifier configured to receive a portion of water flow supplied at the second surface by the water inlet conduit and supply moisture corresponding to the portion of water flow into the air outlet channel.

In one embodiment, the present modular interface template further includes a communication conduit from the first surface to the second surface, where the communication conduit is configured to receive communication connection at the second surface.

An object of the present invention is to provide a comfort device mountable and serviceable outside of a space within which the comfort device is configured to service where the space is contained in a building. In order to mount a comfort device mountable from the outside of the space, a modular interface template is provided where the modular interface template is configured to be mounted on a wall of the building or the modular interface template itself doubles as a wall or a portion of a wall configured to receive infrastructure such as air ducts, water pipes, gas line and electric wiring, etc.

Another object of the present invention is to provide a comfort device that is plug and play and easily swappable even by unskilled installation personnel.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
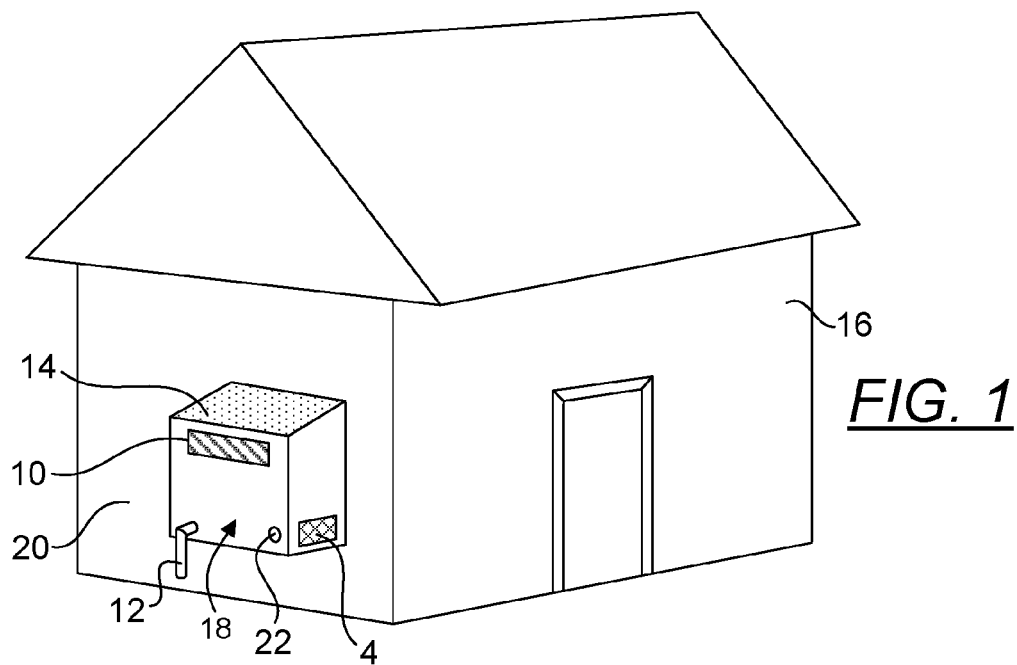
FIG. 1 is a top perspective view of a building, depicting the use of a present comfort device.

2—interface template
4—air intake port with outdoor temperature sensor
6—air inlet channel
8—air outlet channel
10—flue exhaust port
12—condensate drain port
14—solar panel
16—building serviced by comfort device
18—plug and play comfort device
20—wall where plug and play comfort device is mounted
22—communication conduit
24—water inlet conduit
26—water outlet conduit
28—gas conduit
30, 32—electric power conductor
34—first surface
36—second surface
38—lip
40—fastener
42—air heater/furnace and/or air conditioner/chiller
44—water heater
46—enclosure
48—humidifier
50—insulation
52—inner tube
54—outer tube
56—tube from space to be serviced
58—collar
60—seal or O-ring
62—valve spring
64—valve stem
66—valve seat
68—valve rod
70—flow path
72—microswitch
74—flow sensor, e.g., doppler type
76—inner flow space
78—outer flow space
80—adaptor tube
82—shoulder
84—controller
86—communication device
88—pressure switch

PARTICULAR ADVANTAGES OF THE INVENTION

The present interface template is provided to facilitate the installation of a plug and play comfort device including at least one, but not limited to, one of the following appliances: a water heater, an air heater and a humidifier.

The present interface template is provided to facilitate the installation of a plug and play comfort device on the exterior of a building such that the comfort device is accessible for maintenance or replacement from the exterior of the building without requiring access to the interior of the building.

In one embodiment, a leak-proof adaptor tube is adapted to at least one of the water inlet conduit, water outlet conduit and gas conduit such that leaks that may occur within any one of the conduits may be contained. Rapid connection or removal of a comfort device to a present template is made possible by having leak-proof and automatic shutoff measures as a connection can be made as simply as inserting one end of the adaptor tube into a conduit of the template for making a connection and withdrawing the end of the adaptor tube from the conduit of the template for removing the connection.

In one embodiment, a pressure switch, flow sensor, microswitch or any combinations of these devices, may be used to identify one or more problems that can occur to the installation and operation of a comfort device on an interface template.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The terms "inlet" and "outlet" are used herein to reference the direction in which a resource, e.g., air or water, flows with respect to the wall of a building such resource flows through. For instance, a resource flowing into a building through the wall or interface template is considered an "inlet" flow while a resource flowing out of a building through the wall or interface template is considered an "outlet" flow.

FIG. 1 is a top perspective view of a building 16, depicting the use of a present comfort device 18. The present comfort device 18 and its modular interface template 2 are preferably taken into consideration during the planning and construction of a building as such activities can result in favorable placements of utilities connecting points to the modular interface template 2. It is also possible to modify an existing building to replace existing conventional comfort devices. If modification is chosen, the wall at which a present comfort device will be mounted is preferably a wall or an extension of a wall (if the existing conventional comfort device is mounted in a basement) on the first floor. A first floor mount enables simple, elevation equipment-free mounting.

Figure 2:
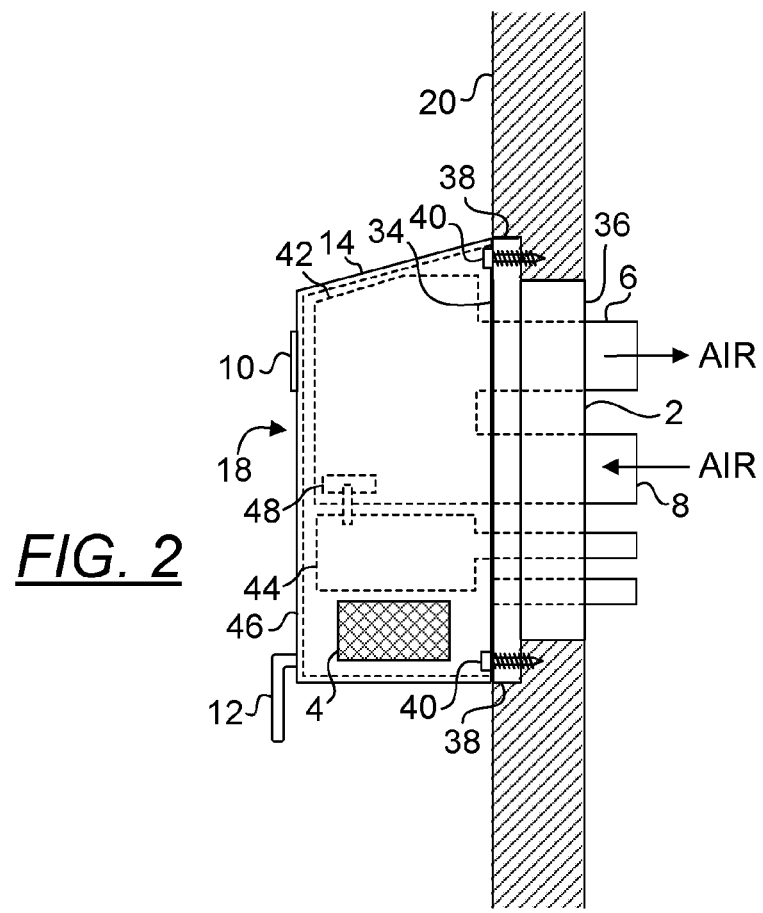
FIG. 2 is a partially transparent side orthogonal sectional view of a present interface template and a present comfort device adapted to the present interface template.
Figure 3:
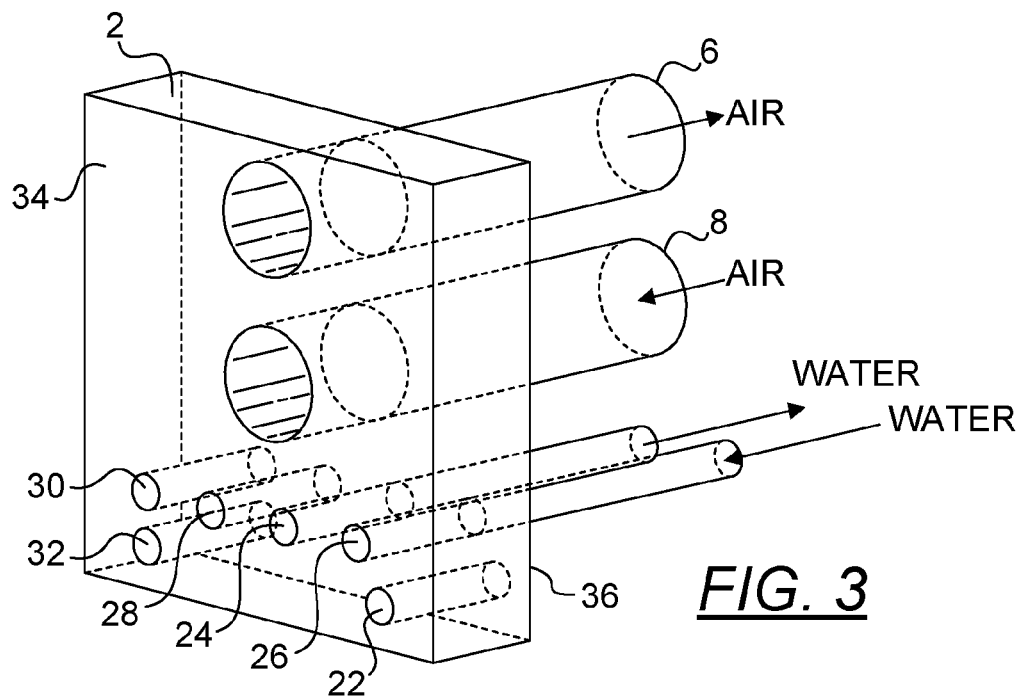
FIG. 3 is a partially transparent top perspective view of a present interface template.

FIG. 2 is a partially transparent side orthogonal sectional view of a present interface template 2 and a present comfort device 18 adapted to the present interface template 2. It is to be understood that whereas only a furnace 42, a water heater 44 and a humidifier 48 are depicted therein, there is no intention to limit the invention to these devices. All devices are however preferably contained within an enclosure 46 for protection and neat appearance. FIG. 3 is a partially transparent top perspective view of a present interface template 2. A modular interface template 2 is configured to receive a plug and play comfort device 18. The modular interface template 2 includes a wall having a first surface 34 and a second surface 36, an air inlet channel 6, an air outlet channel 8, a gas conduit 28, a water inlet conduit 24, a water outlet conduit 26, a first electric power conductor 30 and a second electric power conductor 32. The modular interface template 2 may be removably secured to the wall 20 via one of several common construction techniques. In one embodiment, the modular interface template 2 does not include a gas conduit 28 as all components of the comfort device 18 which require power are electrically driven. Alternatively, when not in use, any facilities including a gas conduit 28 of the interface template 2 may be plugged to avoid intrusions of pests. In another embodiment, each of these facilities may alternatively be automatically plugged as disclosed elsewhere herein. Wall 20 may be constructed such that an opening is left in the wall 20 so that a modular interface template 2 can be inserted in the opening and secured to the wall 20 via common fastening techniques such as screwing the modular interface template 2 into the periphery of the opening. Where appropriate, steel or wood studs may be used to frame the opening, thereby providing a sturdy frame onto which a modular interface template 2 can be secured via common fastening techniques. In the embodiment shown in FIG. 2, a lip 38 is further disposed around the second surface of the modular interface template 2 and an appropriate offset complementary to the lip 38 is disposed on the frame to receive the lip 38. Fasteners 40, e.g., screws are used to secure the modular interface template 2 at the lip 38 to the frame.

The air inlet channel 6 connects the first surface 34 and the second surface 36, where the air inlet channel 6 is configured to enable air flow from the first surface 34 to the second surface 36. An air heater or furnace is provided in the comfort device 18 to receive return air from within the building through air outlet channel 8. The air outlet channel 8 connects the second surface 36 and the first surface 34, where the air outlet channel is configured to enable air flow from the second surface 36 to the first surface 34. The gas conduit 28 connects the first surface 34 and the second surface 36, where the gas conduit 28 is configured to supply fuel from the first surface 34 to the second surface 36. The water inlet conduit 24 connects the first surface 34 and the second surface 36, where the water inlet conduit 24 is configured to enable water flow from the first surface 34 to the second surface 36. The water outlet conduit 26 connects the second surface 36 and the first surface 34, where the water outlet conduit 26 is configured to enable water flow from the second surface 36 to the first surface 34. The first electric power conductor 30 connects the first surface 34 to the second surface 36, where the first electric power conductor 30 is configured to enable electric power transmission from the first surface 34 to the second surface 36. In one embodiment, electric power conductor shall be disposed as distantly from a liquid or gas connection as possible within the template such that any leaks from such services may be avoided as much as possible. In one embodiment, electric power conductor shall be disposed at an elevation that is above that of water connection within the template such that any leaks from the water service may not directly affect the electric power conductor.

Upon installation of the modular interface template 2, it is now ready to receive various services from the building interior. A supply air duct is connected to the air inlet channel 6 on the first surface 34. A return air duct is connected to the air outlet channel 8 on the second surface 36. A blower-equipped air heater may be provided in the comfort device 18 to heat the air drawn into the air heater through air outlet channel 8. Heated air is returned via the air inlet channel 6 to the supply air duct to the interior of the building. Ambient air (or make-up air) may also be drawn through an air intake port 4 on the comfort device 18 and subsequently mixed with the return air to be heated and sent to the return air duct. A water supply line is connected to the water inlet conduit 24 where a supply of unheated water is available. A water heater may be provided in the comfort device 18 to heat the water supplied via the water outlet conduit 26. A water supply line is connected to the water inlet conduit 24 where a supply of heated water is sent to various points of usage of the building 16. A gas supply line is connected to the gas conduit 28 where a supply of fuel, e.g., natural gas, propane, etc., is fed into a device requiring the fuel, e.g., a water heater, an air heater and the like. An air chiller may be provided in the comfort device 18 to chill the air drawn in via the air outlet channel 8 and ambient air through the air intake port 4. A humidifier may be provided in the comfort device 18 where a supply of water is again obtained via the water outlet conduit 26. Runoffs from the humidifier may be discharged directly into a condensate drain 12 which also drains condensations from any one of the air heater, water heater and air chiller. A communication conduit 22 connecting the first surface 34 and the second surface 36 may be provided to enable one or more communication, e.g., ethernet cables, etc. to be routed through the conduit from the interior space of the building 16. In another embodiment, the comfort device 18 includes an on-board wireless communication controller and therefore does not require a physical communication cable. In yet another embodiment, a communication cable may be made available outside of the building 16 and can therefore be connected directly to the comfort device 18. Also disclosed is a first electric power conductor 30 connecting the first surface 34 to the second surface 36, where the first electric power conductor is configured to enable electric power transmission from the first surface 34 to the second surface 36. This electric power conductor 30 enables the comfort device 18 to receive power such that any appliances requiring electric power may be powered. In one embodiment, a second electric power conductor 32 may be provided to allow flow of excess electrical power to be sent back into the building, e.g., in the case where a solar panel 14 is used to generate electricity. In this embodiment, the energy collected from the solar panel 14 may also be stored locally in a battery disposed within the comfort device 18 or in a location in the building 16. Although the capacity of such storage may not be sufficient to power the appliances and their corresponding controllers for an extended amount of time, it may be used to power the appliances during power outages. In one embodiment, one or more fuel cell units are provided to generate electric power. A by-product of such units comes in the form of heat which may in turn be used to power a heat pump to provide heating or cooling. Alternatively or additionally, electrical conduits may be made available instead such that electrical wires may be routed through such conduits. A flue exhaust port 10 is configured to channel all flue gases as a result of combustion and other waste by-products out of the comfort device 18. Care shall be taken to ensure that the flue exhaust port 10 not be disposed adjacent the air intake port 4 so that no flue gas is pulled directly back into the building through the air intake port 4. The flue exhaust port 10 may alternatively be extended upwardly to create an even greater distance between the flue exhaust port 10 and the air intake port 4.

In one embodiment, the direction of air flow may be reversed to normalize the temperatures of serviced space, i.e., the air outlet channel 8 now serves as an air supply path into the space of the building 16 while the air inlet channel 6 serves as an air path to the comfort device 18. In typical building construction practices where air supply and return ducts are made available, the ducts are spatially disposed in opposite ends. For instance, if the supply ducts empty heated or cooled air into a space near the bottom of a wall, the return duct is typically disposed near the top of a wall disposed in the opposite side of the space. The intent is to have the circulated air traverse the space as much as possible. The ability to reverse air flow enables cold air to be forced into a space from the vents disposed at the top of the space while warm air is forced via vents into the space from the bottom of the space. As cold air sinks and warm air rises, the ability to force air into a space and draw air from the space at suitable locations enables traversal of the forced air through the entire space, removing stratification of the volume of air in the space and making the space more comfortable for its occupant. Care shall be taken to ensure that, if air filters are used, that the air filters be reversed to anticipate the change in air flow direction.

In one embodiment, one or more appliances of the group of appliances are modular. Therefore, it is possible to replace only one appliance within a device and not the device itself if not all of the appliances need replacement or repair. As each appliance is modular, a faulty appliance may be removed for repair while an interim replacement can be installed to ensure continued services are provided or to cut down on downtime while repairs are performed.

Figure 4:
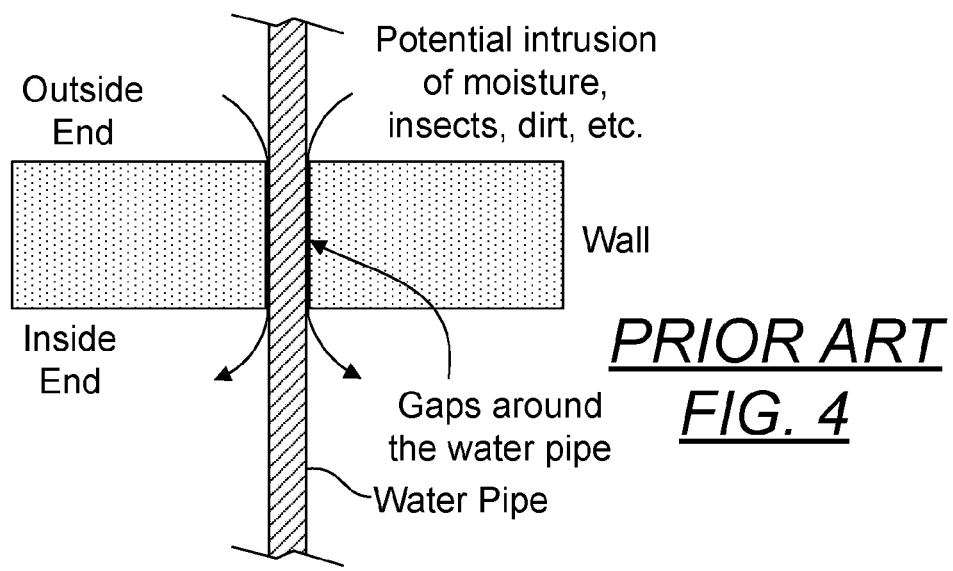
FIG. 4 depicts a prior art scenario where a wall is configured to simply allow penetration of a service via the wall.
Figure 5:
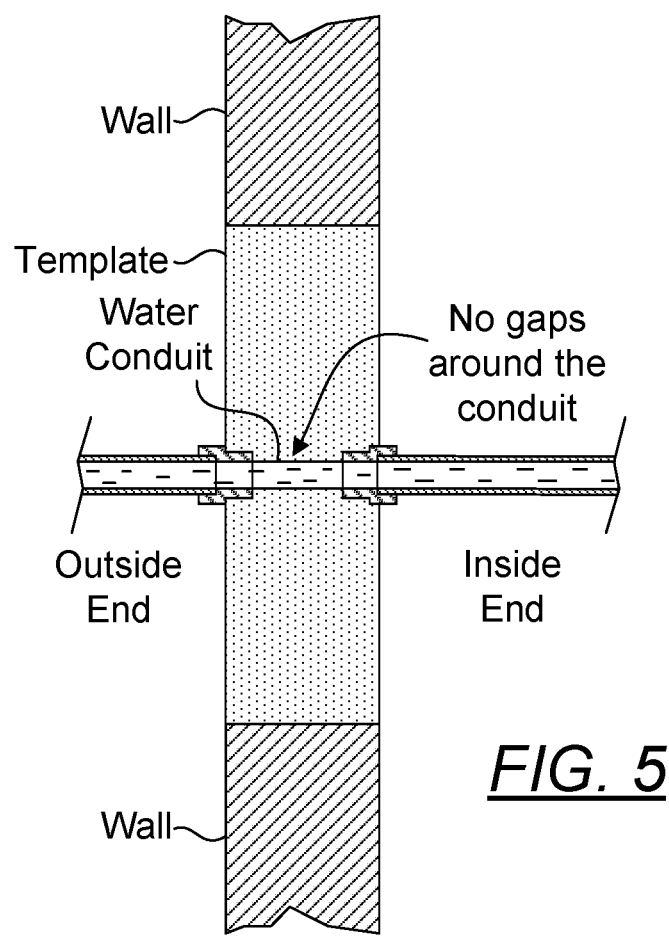
FIG. 5 depicts a configuration of a present template where the conduits connecting the first and second walls of the template connect the conduits on both sides of the walls of the template.

FIG. 4 depicts a prior art scenario where a wall is configured to simply allow penetration of a service via the wall. It shall be apparent that apertures or holes through which services, e.g., water, gas, etc., are delivered may become pathways through which intrusions of moisture, insects, dirt, etc., can occur even with application of conventional sealing materials surrounding the conductors configured for delivering such services. FIG. 5 depicts a configuration of a present template where the conduits connecting the first and second walls of the template connect the conduits on both walls of the template. It shall be noted that the present conduits or other services that are disposed within the template are constructed as part of the template and not simply apertures allowing conductors either from a comfort device or from a space within which the comfort device is configured to service to pass through.

Figure 6:
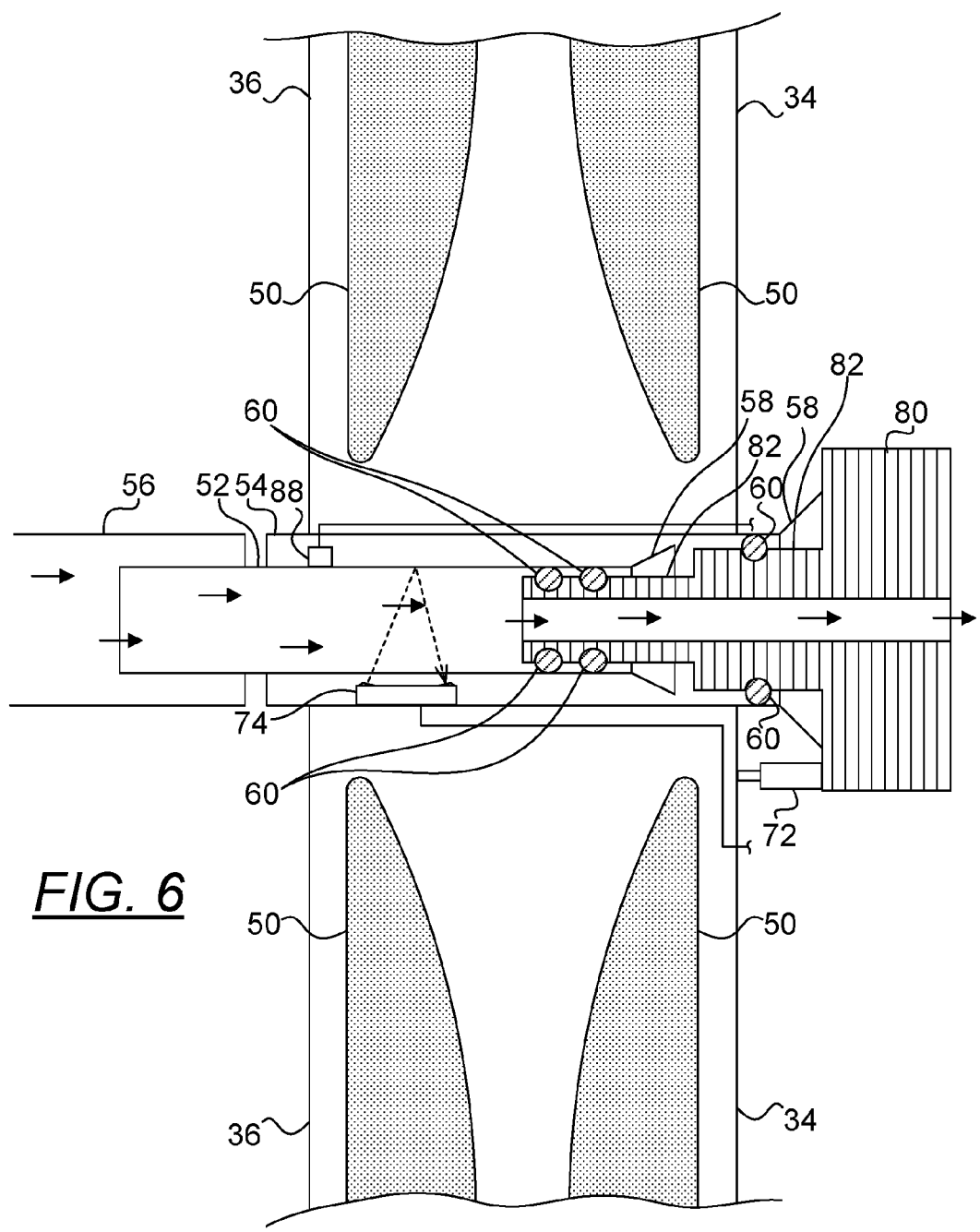
FIG. 6 is a cross-sectional view of a present template, depicting one embodiment of a present conduit configured for containing leak and flow detection.

FIG. 6 is a cross-sectional view of a present template, depicting one embodiment of a present conduit configured for containing leak and flow detection. Such configuration is applicable to a water inlet conduit, water outlet conduit and gas conduit connecting a first surface 34 to second surface 36 where the leak of materials from such conduits can potentially cause severe problems and damages. The conduit includes an outer tube 54 and an inner tube 52 disposed substantially concentrically with said outer tube 54 within the outer tube 54. A pipe 56 is shown connected to one end of the inner tube 52. Such connection may be made via any conductor joining techniques. The outer tube 54 is configured to be terminated against the inner tube 52 on one end of the tubes 52, 54 and the inner tube 52 and the outer tube 54 are configured to be flared on the another end to terminate in their respective flared collars to ease insertion of their respective adaptor tubes that are connected to particular equipment in a comfort device by "guiding" the adaptor tubes appropriately. For example, the adaptor tube shown is connected to a heat exchanger coil in a water heater. In use, a comfort device having adaptor tubes such as this adaptor tube can quickly be "docked" via the template to quickly receive services via the template and send altered services also via the template to the other side of the template. In the embodiment shown, the conduit is configured to enable water flow from the second surface 36 to the first surface 34, such as in the case of a water outlet conduit 26. The same construction of may also be used on a water inlet conduit 24.

For a gas conduit 28, the size and shape of the flared collar 58 of the inner and outer tubes 52, 54 may be configured differently such that the adaptor tube used for each type of service is distinct to avoid confusion or mistake in connecting an adaptor tube to an incorrect service. An adaptor tube 80 includes two shoulders 82, each having a distinct outer diameter. A first of the shoulders 82 is configured to removably seal against the lumen of the inner tube 52 to form an inner flow space 76. In one embodiment a double seal is employed to contain fluid within flow space 76. Two O-rings 60, each seated within a groove facilitates insertion of the smaller diameter shoulder 82 within the lumen of the inner tube 52 and prevents leakage from flow space 76 to flow space 78. A second of the shoulders 82 is configured to removably seal against the lumen of the outer tube to form an outer flow space 78. One O-ring 60 seated within a groove facilitates insertion of the larger diameter shoulder 82 within the lumen of the outer tube 54 and prevents any leakage from flow space 78 to its surroundings.

In one embodiment, there is further provided a microswitch 72 configured to detect the proper seating of an adaptor tube 80 against a conduit. A trigger mechanism of the microswitch 72 is configured to be pressed against a portion of the first wall 34 when adaptor tube has been deemed properly seated. In one embodiment, there is further provided a flow sensor 74, e.g., of Doppler type, configured to detect a flowrate within at least one of the conduit. This flow sensor provides a flowrate within the conduit that, upon being compared to an expected flowrate, can indicate whether or not a service is properly provided to or received from a comfort device connected to the conduit. In one embodiment, there is further provided a pressure switch 88 configured to detect a flow within a conduit. Again, the pressure switch 88 provides an indication whether a flow exists when a flow is expected. This serves to verify, in addition of the flowrate readings of the flow sensor that whether a flow exists. It is also possible that the range of operations of the pressure switch 88 and flow sensor 74 can be used to complement one another.

In one embodiment, the wall further includes insulation materials 50 disposed between the first surface 34 and the second surface 36 for both thermally and audibly isolating the comfort device from the environment which the comfort device services as the footprint of the comfort device represents a large area through which thermal and sound transfer can occur. In one embodiment, the template is first constructed with its structural frame that serves as the backbone for load bearing and attachment surfaces, leaving non-load bearing portions or cavities within the structural frame for receiving one or more insulation materials that may be readily dispensed or sprayed into the cavities.

Figure 7:
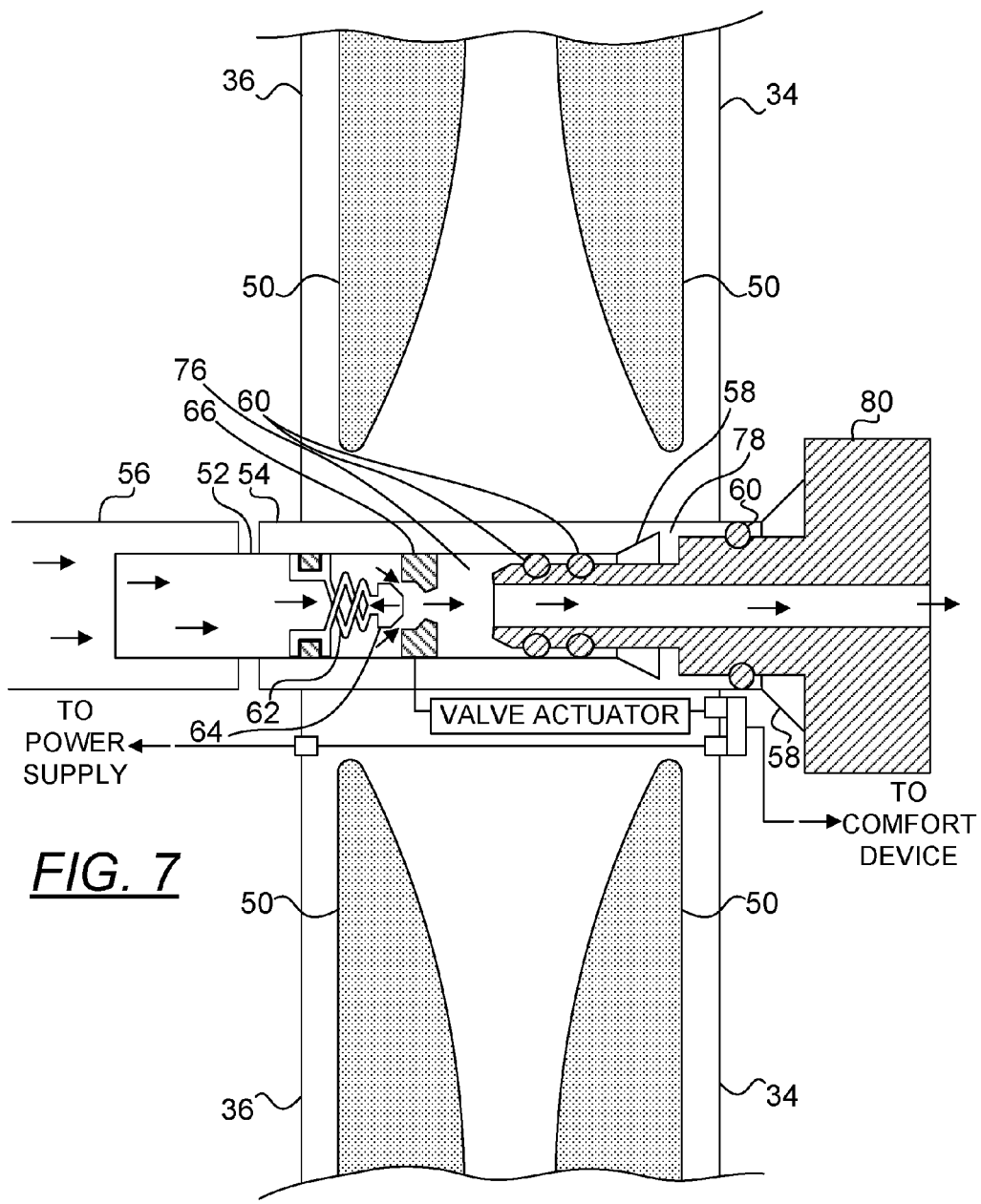
FIG. 7 is a cross-sectional view of a present template, depicting one embodiment of a present conduit configured for containing leak and automatic shutoff of a flow through the present conduit.

FIG. 7 is a cross-sectional view of a present template, depicting one embodiment of a present conduit configured for containing leak and automatic shutoff of a flow through the present conduit. In this embodiment, a valve is provided where its operation is based on an electrical connection. An electrically controlled automatic shutoff device is provided for shutting off or enabling flow to a conduit. In one example, an electrical connection is provided when a plug (i.e., a part of a comfort device) is inserted into a socket (i.e., a part of a template). Therefore, as a comfort device is seated and installed, the plug will be inserted in the socket causing power connection to the valve actuator to be made and hence valve actuator to be enabled and/or powered. A removal of the plug removes the power connection, disabling the valve actuator. As the valve is normally closed when it is not powered, if a connection is broken, the valve is automatically disposed in the closed position when a power connection to the comfort device has been removed. A re-connection of the power connection re-enables or re-powers the valve. As shown herein, a valve stem 64 is unseated from the valve seat 66 as the valve actuator causes the valve spring 62 to dispose the valve stem 64 in the unseated position. If the valve loses power, the valve spring 62 pushes the valve stem 64 against the valve seat 66, terminating any flow in flow space 76.

Figure 8:
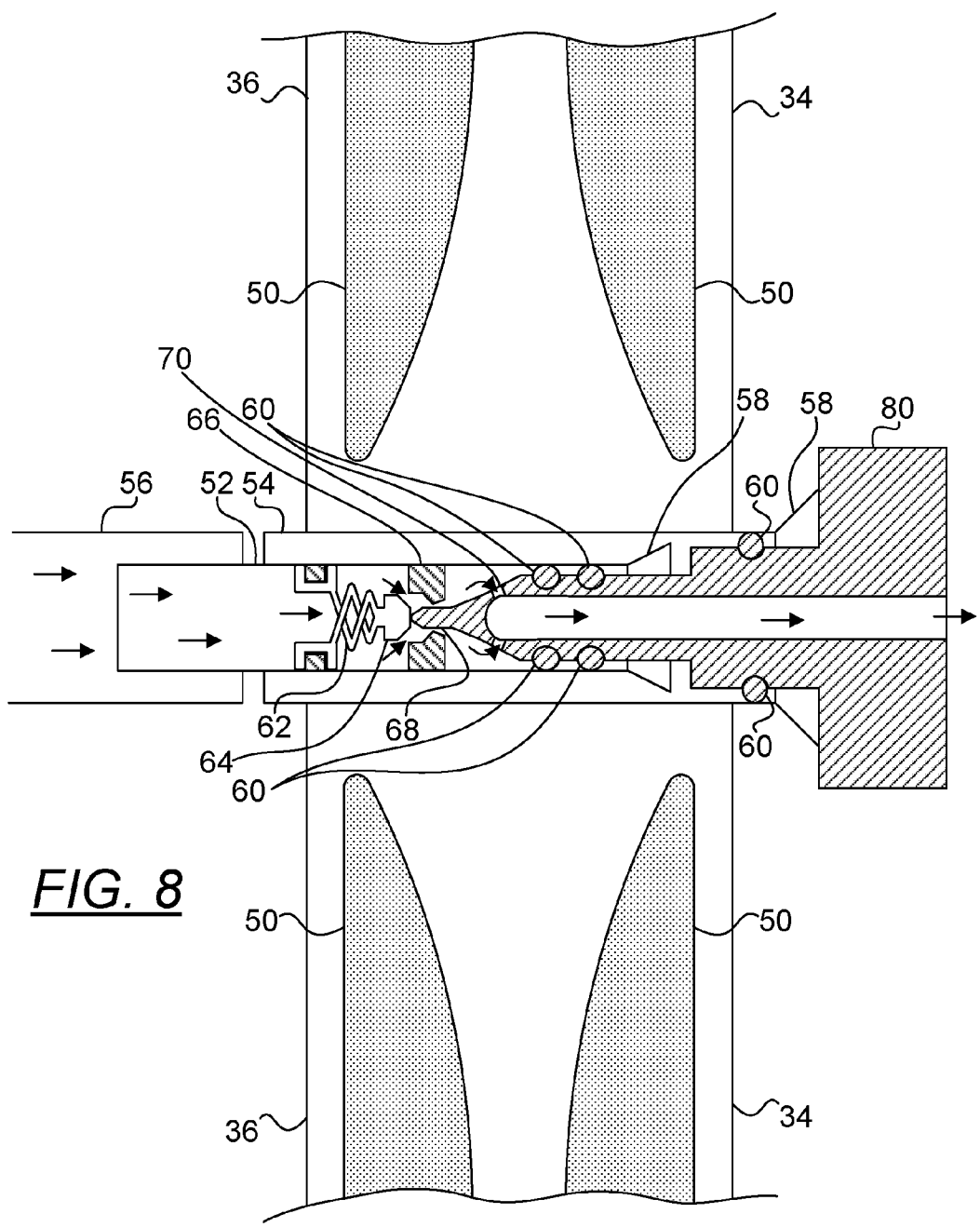
FIG. 8 is a cross-sectional view of a present template, depicting one embodiment of a present conduit configured for containing leak and automatic shutoff of a flow through the present conduit.

FIG. 8 is a cross-sectional view of a present template, depicting one embodiment of a present conduit configured for containing leak and automatic shutoff of a flow through the present conduit. A mechanically controlled automatic shutoff device is provided for shutting off or enabling flow to a conduit. In one example, a modified adaptor tube is configured to be coupled with the valve component-equipped conduit to dispose the valve seat 66 in an unblocked position. A valve rod 68 is configured to extend from the modified adaptor tube. As the modified adaptor tube is inserted in the conduit, the valve rod 68 urges the valve stem 64 to dislodge from the valve seat 66, causing the valve to open and fluid flow through flow paths 70 in the modified adaptor tube. A removal of the adaptor tube from the conduit causes the valve to be closed. The valve is normally closed when an adaptor is absent. A re-insertion of an adaptor tube opens the valve. As shown herein, a valve stem 64 is unseated on the valve seat 66 as the valve rod 68 pushes against the valve stem 64, compressing the valve spring 62 which is ready ready to return the valve stem 64 to its closed position in pushing against the valve seat 66 once the adaptor tube is removed.

Referring back to FIGS. 6-8, it shall be apparent that rapid connection or removal of a comfort device to a present template is made possible by having leak-proof and automatic shutoff measures as a connection can be made as simply as inserting one end of the adaptor tube into a conduit of the template for making a connection and withdrawing the end of the adaptor tube from the conduit of the template for removing the connection. Further, the interfaces of the present conduits and any ports of the present interface template are preferably polarized such that an accidental insertion or connecting attempt will fail and potential problems can be averted.

Figure 9:
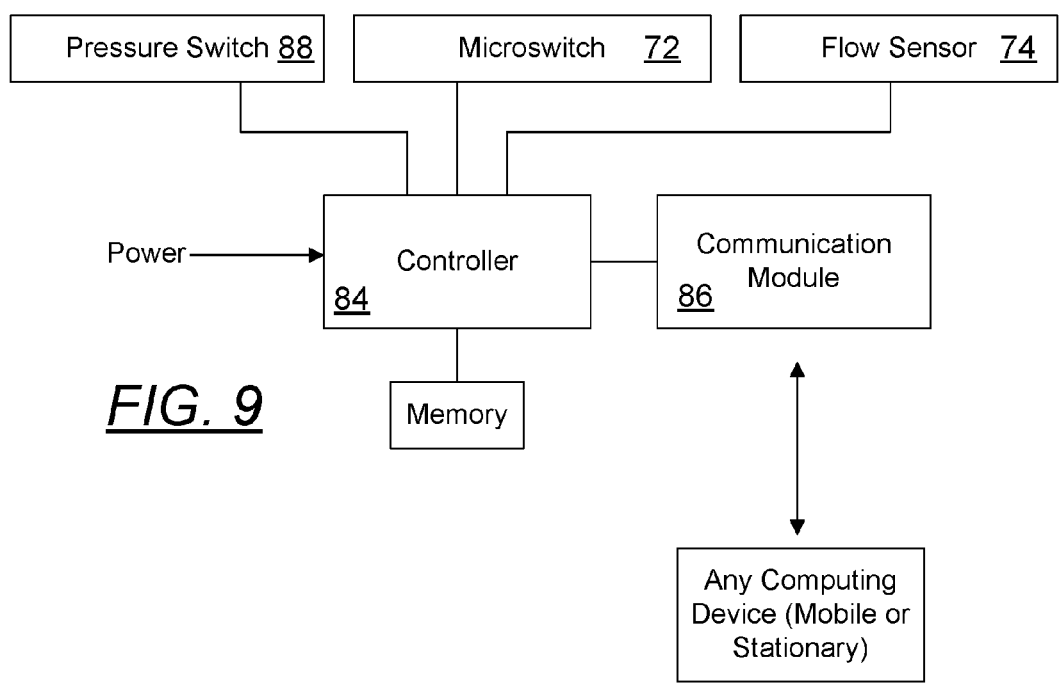
FIG. 9 is a diagram depicting a means by which verification data from a present template may be communicated to a second device.

FIG. 9 is a diagram depicting a means by which verification data from a present template may be communicated to a second device. Any sensors of the present template including but not limited to a pressure switch, microswitch and flow sensor may be functionally connected to a controller 84 that is provided on-board with the present template or outside of the template. A communication device 86 configured for communicating via Bluetooth® and Wi-Fi or any suitable communication protocols may be used to communicate with a remote computing device via a wired or wireless connection. For instance, data from the above mentioned sensors or switches may be communicated in real time to a remote computing device to warn a user that an unexpected condition has been detected. Upon setting up a comfort device on a template, a diagnostic routine that confirms the proper physical and/or functional connections of the services may be run and the result of the diagnostic routine may also be communicated to the remote computing device. Alternatively, a diagnostic routine may be disposed and executed at a remote location and accessed via a communication protocol, e.g., via the Ethernet protocol.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A modular interface template (2) configured to receive a plug and play comfort device (18), said modular interface template (2) comprising:
   (a) a wall having a first surface (34) and a second surface (36);
   (b) an adaptor tube (80) having two shoulders (82), each having a distinct outer diameter;

(c) an actuator configured to be coupled to said adaptor tube (80); and (d) at least one water conduit (24, 26) connecting said second surface (36) and said first surface (34), said at least one water conduit (24, 26) consisting of an outer tube (54), an inner tube (52) disposed within said outer tube (54) and a spring-loaded valve disposed within said inner tube (52), said outer tube (54) having an outer wall integrally built with said wall of said template, said spring-loaded valve is configured for selective enablement of water flow within said inner tube (52) between said second surface (36) and said first surface (34) by a state of said actuator, a first of said shoulders (82) configured to removably seal against a lumen of said inner tube (52) to form an inner flow space (76) and a second of said shoulders configured to removably seal against a lumen of said outer tube to form an outer flow space (78) without fluid communication between said inner flow space (76) and said outer flow space (78), wherein a leak from said inner flow space (76) enables fluid communication between said inner flow space (76) and said outer flow space (78) and the leak is contained within said outer flow space (78), wherein if the actuator is active, said spring-loaded valve is opened to enable said water flow, and if the actuator is not active, said spring-loaded valve is closed to disable said water flow and said outer tube (54) is configured to be connected to a portion of said inner tube (52) on a first portion of said tubes (52), (54) and said inner tube (52) and outer tube (54) are configured to be flared on a second portion of said tubes (52), (54) to ease insertion of the adaptor tube.

2. The modular interface template (2) of claim 1, further comprising a microswitch (72) configured to detect the proper seating of said adaptor tube (80) against said water outlet conduit (26).

3. The modular interface template (2) of claim 1, further comprising a gas conduit (28) connecting said first surface (34) and said second surface (36), wherein said gas conduit comprises an outer wall integrally built with said wall of said template and said gas conduit is configured to supply fuel from said first surface (34) to said second surface (36).

4. The modular interface template (2) of claim 3, wherein said gas conduit (28) further comprises an outer tube (54) and an inner tube (52) disposed within said outer tube (54) of said gas conduit within said outer tube (54) of said gas conduit, said outer tube (54) of said gas conduit is configured to be connected to said inner tube (52) of said gas conduit on a first portion of said tubes (52), (54) of said gas conduit and said inner tube (52) of said gas conduit and outer tube (54) of said gas conduit are configured to be flared on a second portion of said tubes (52), (54).

5. The modular interface template (2) of claim 4, further comprising a gas adaptor tube (80) including two shoulders (82), each having a distinct outer diameter, a first of which shoulders (82) of said gas adaptor tube configured to removably seal against the lumen of said inner tube of said gas adaptor tube to form an inner flow space (76) and a second of which shoulders (82) of said gas adaptor tube configured to removably seal against the lumen of said outer tube of said gas adaptor tube to form an outer flow space (78), wherein a leak from said inner flow space (76) of said gas adaptor tube is contained within said outer flow space (78) of said gas adaptor tube.

6. The modular interface template (2) of claim 3, further comprising a flow sensor (74) configured to detect a flowrate within at least one of said water inlet conduit (24), water outlet conduit (26) and gas conduit (28).

7. The modular interface template (2) of claim 6, further comprising a wireless communication device configured for communicating readings of said flow sensor (74) to a computing device wirelessly.

8. The modular interface template (2) of claim 3, further comprising a pressure switch (88) configured to detect a flow within at least one of said water inlet conduit (24), water outlet conduit (26) and gas conduit (28).

9. The modular interface template (2) of claim 3, further comprising an electrically controlled automatic shutoff device for shutting off flow on said gas conduit (28).

10. The modular interface template (2) of claim 3, further comprising a mechanically controlled automatic shutoff device for shutting off flow on said gas conduit (28).

11. The modular interface template (2) of claim 1, further comprising:

(a) an air inlet channel (6) connecting said first surface (34) and said second surface (36), wherein said air inlet channel (6) is configured to enable air flow between said first surface (34) and said second surface (36); and (b) an air outlet channel (8) connecting said second surface (36) and said first surface (34), wherein said air outlet channel (8) is configured to enable air flow between said second surface (36) and said first surface (34).

12. The modular interface template (2) of claim 1, further comprising at least one electric power conductor (30), (32) connecting said second surface (36) and said first surface (34), wherein said at least one electric power conductor (30), (32) is integrally built with said wall of said template and is configured to enable electric power transmission between said second surface (36) and said first surface (34).

13. The modular interface template (2) of claim 11, further comprising a comfort device (18) comprising an air heater (42) configured to receive air flow supplied at said first surface (34) by said air outlet channel (8) and add heat to said air flow and send the air flow to said second surface (36) at said air inlet channel (6).

14. The modular interface template (2) of claim 11, further comprising a comfort device (18) comprising an air chiller (42) configured to receive air flow supplied at said first surface (34) by said air outlet channel (8) and remove heat from said air flow and send the air flow to said second surface (36) at said air inlet channel (6).

15. The modular interface template (2) of claim 1, further comprising a comfort device (18) comprising a water heater (44) configured to receive water flow supplied at said first surface (34) by said water outlet conduit (26) and add heat to the water flow and send the water flow to said second surface (36) at said water inlet conduit (24).

16. The modular interface template (2) of claim 11, further comprising a comfort device (18) comprising a humidifier (48) configured to receive a portion of water flow supplied at said first surface (34) by said water outlet conduit (26) and supply moisture derived from the portion of water flow into said air inlet channel (6).

17. The modular interface template (2) of claim 1, further comprising a communication conduit (22) between said first surface (34) and said second surface (36), wherein said communication conduit (22) is integrally built with said wall of said template and is configured to receive a communication connection at said first surface (34).

18. The modular interface template (2) of claim 1, wherein said wall further comprises insulation materials (50) disposed between said first surface (34) and said second surface (36).

\* \* \* \* \*